United States Patent
Vanzetti et al.

[11] 3,867,697
[45] Feb. 18, 1975

[54] MEASURING MEANS

[75] Inventors: Riccardo Vanzetti, Walpole; Ashod S. Dostoomian, Stoughton, both of Mass.

[73] Assignee: Vanzetti Infrared & Computer Systems, Inc., Dedham, Mass.

[22] Filed: Aug. 20, 1971

[21] Appl. No.: 173,518

Related U.S. Application Data

[63] Continuation of Ser. No. 847,820, July 29, 1969, abandoned, which is a continuation-in-part of Ser. No. 796,804, Feb. 5, 1969, abandoned.

[52] U.S. Cl......... 324/158 D, 324/158 F, 350/96 B, 350/96 C
[51] Int. Cl............................................. G01r 31/26
[58] Field of Search ....... 324/158 F, 158 D, 158 R, 324/73 R, 51; 350/96 B

[56] References Cited
UNITED STATES PATENTS

| | | | |
|---|---|---|---|
| 3,068,739 | 12/1962 | Hicks, Jr. et al. | 350/96 B |
| 3,315,160 | 4/1967 | Goodman | 324/73 R |
| 3,488,586 | 1/1970 | Watrous et al. | 324/96 |

OTHER PUBLICATIONS

Klass, P. J., "Use of Infrared..."; Aviation Week & Space Technology; May 4, 1964; pg. 82, 87, 88, 89.
Laczko et al; "Electro-optical Probe"; IBM Tech. Dis. Bull.; vol. 12, No. 6; Nov. 1969; pg. 868.

*Primary Examiner*—Alfred E. Smith
*Assistant Examiner*—Ernest F. Karlsen
*Attorney, Agent, or Firm*—Seidel, Gonda & Goldhammer

[57] ABSTRACT

A means and method of providing a signal representative of the signal across semi-conductor junctions without loading the junctions or a means and method of determining the quality of thermal bonds includes an adjustable support for the device with a junction or bond, and a radiation detector responsive to radiation from the junction or thermal bond. A light pipe may convey radiant energy, such as recombination or thermal radiation, from the junction or thermal bond to the detector. The radiation may be modulated so as to provide a constant reference level for the output signal from the detector.

7 Claims, 7 Drawing Figures

PATENTED FEB 18 1975

INVENTORS
Riccardo Vanzetti
BY Ashod S. Dostoomian
Wolf, Greenfield, Hieken & Sacks.

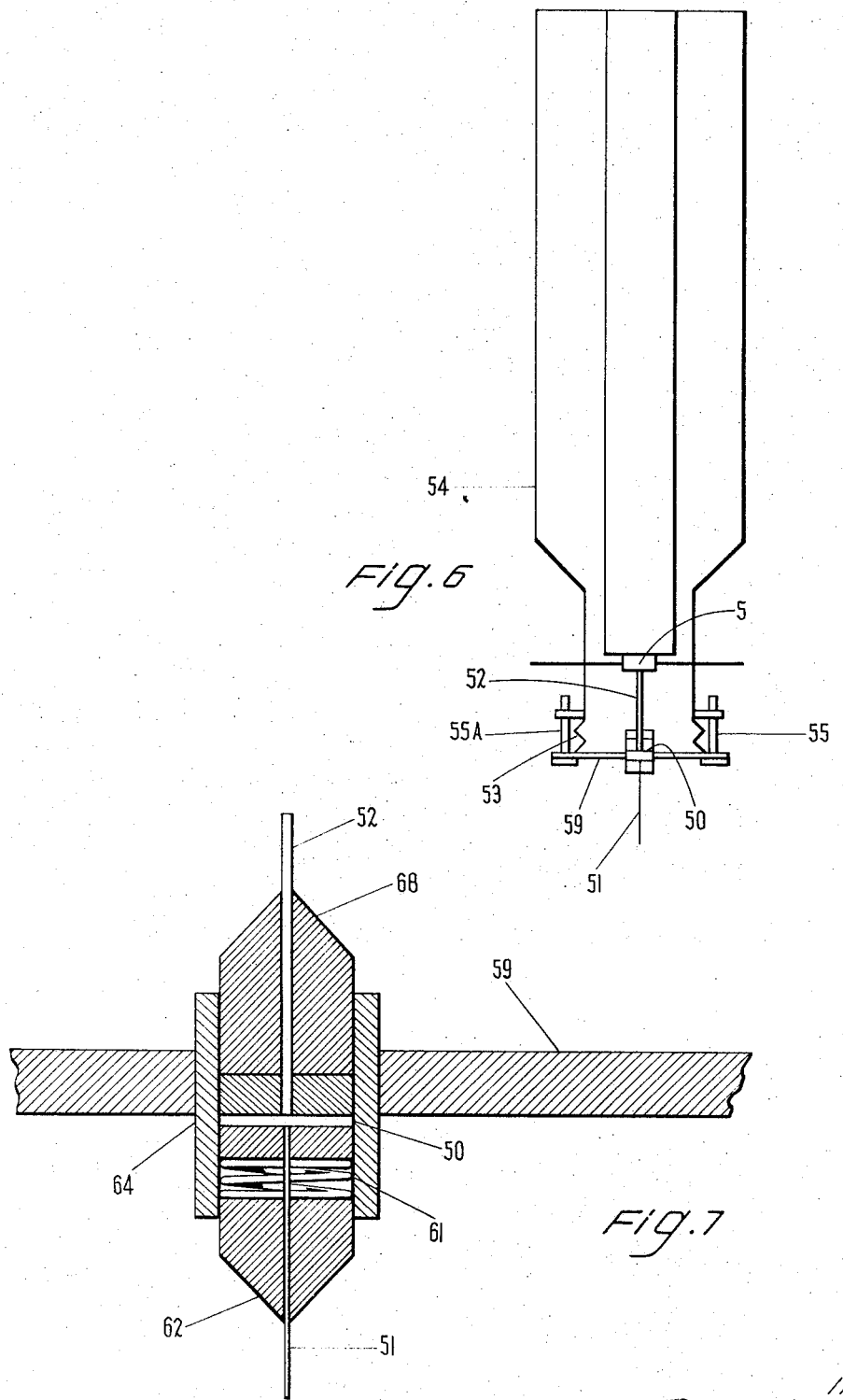

MEASURING MEANS

CROSS REFERENCE TO RELATED APPLICATION

This application is a continuation of our application filed July 29, 1969, Ser. No. 847,820, which is a continuation-in-part of our application, Ser. No. 796,804, filed Feb. 5, 1969, both now abandoned.

BACKGROUND OF THE INVENTION

The present invention relates in general to semiconductor junction measurements and more particularly concerns a novel method and means for providing a signal representative of the signal across a semiconductor junction without loading the junction. The invention is especially suitable for monitoring signals across selected junctions of an integrated circuit without affecting its electrical performance.

The present invention also relates in general to evaluating the quality of material bonds made by thermal techniques and more particularly concerns a novel method and means for monitoring thermal flow from a thermal bond. The invention is especially suitable for passively monitoring thermal bonds in an instantaneous fashion.

It is an important object of the present invention to provide method and means for monitoring semiconductor junction performance without loading the junction.

It is another object of the invention to achieve the preceding object without contacting the semiconductor junction.

A further object of this invention is to achieve one or more of the preceding objects with a passive method of signal detecting.

A further object of this invention is to provide a signal representative of a selected junction signal in integrated circuits or other miniature components in accordance with one or more of the preceding objects.

A further object of this invention is to provide a signal in accordance with the preceding object suitable for recording or display.

A further object of this invention is to provide a precise repeatable method of making spectrophotometric measurements of radiation emitted from areas having a size in the order of magnitude of an integrated circuit junction.

A further object of this invention is to provide a precise repeatable method of determining physical or chemical characteristics of semiconductor junction by spectrophotometric techniques.

It is another object of this invention to provide a method and means for monitoring the quality of thermal bonds without affecting the temperature of the thermal bond.

A further object of this invention is to achieve one or more of the preceding objects while providing an essentially instantaneous indication of the quality of the thermal bond.

A further object of this invention is to provide a precise repeatable method of determining the quality of thermal bonds which will respond immediately to temperature changes of the thermal bond.

It is a further object of the invention to provide a means and method of evaluating the quality of thermal bonds which may provide a signal indicative of such quality to be fed back to control the bonding operation.

It is a further object of this invention to provide a means and method of measuring thermal bonds which will evaluate bond quality while the bonding is in process.

It is a further object of this invention to provide a means and method of evaluating a metal deposition or other layering technique to determine the existence of voids or material discontinuities.

It is a further object of this invention to provide a means and method of evaluating thermal bonds which is susceptible to measuring small bond areas normally inaccessible to conventional optical or thermal measuring devices.

A further object of this invention is to provide a precise repeatable method of determining the quality of thermal bonds which may provide an output signal with a stable reference level.

Another object of this invention is to achieve one or more of the preceding objects while achieving a relatively inexpensive reliable system.

SUMMARY OF THE INVENTION

According to the invention means defining a semiconductor junction or material being bonded are carried by support means. Means are provided for establishing an electrical signal across the junction or thermal flow across or from the materials being bonded. Radiation detecting means is coupled to the junction or thermal bond responsive to radiation therefrom for providing a detected output signal representative of said electrical signal or thermal flow. Preferably light pipe means couple radiant energy from the junction or thermal bond to the detecting means, and means are provided for precisely relatively positioning the junction or thermal bond and the light pipe means. The detected signal may be displayed on an oscilloscope, recorded or fed back to regulate the source of energy. Proper relative positioning may be achieved by means of visual observation through a stereo microscope. A detector, an infrared detector, for exaple, may be example, as close as practical to the junction or to the thermal bond so that a certain amount of radiated energy may be detected. For probing especially close to the junction or thermal bond, a relatively thin light pipe, such as an optical fiber, may be combined with the detector. An optical fiber-infrared detector combination may be attached to the stereo-microscope in such a manner as to insure perfect aiming at the closest distance. A modulating instrument may be inserted in the optical fiber-infrared detector combination to interrupt the radiated energy so that a reference level, or base line, may be established on the output signal of the detector.

According to another feature of the invention, proper aiming of the optical fiber-infrared detector combination may be achieved by using a coherent fiber bundle with a conventional microscope. The optical fiber for radiation transmission is assembled to the coherent optical fiber bundle in a fixed position of the field of view. One end of the optical fiber faces the junction or thermal bond while the other end is coupled to the infrared detector whose output signal represents the infrared radiation travelling through the optical fiber.

According to another feature, one or more infrared detectors may be located on one or more of the fibers of the coherent fiber bundle. This eliminates the need for an additional optical fiber for infrared transmission and again allows alignment by viewing with a conventional microscope.

According to another aspect of the invention, the recombination radiation or thermal radiation is transmitted by two optical fibers connected in series with or without a small gap between the fibers. The use of the two optical fibers serves a dual purpose; (1) the optical fiber closest to the semiconductor junction or thermal bond whose radiation is to be detected may be replaced without disassembling the optical fiber-infrared detector combination, and (2) a filter or a modulating instrument may be placed in the gap. The insertion of a filter in the gap allows the invention to be used as a spectrophotometer. The modulating instrument when inserted in the gap allows a reference level or base line to be established on the output signal of the infrared detector.

According to another aspect of the invention there are again two optical fibers for infrared transmission connected serially. The optical fiber farther from the semi-conductor junction or thermal bond whose radiation is to be measured and the infrared detector are incorporated in a closed system consisting of a bellows and Dewar flask arrangement. The bellows allows optimum alignment of the optical fibers for infrared transmission. The Dewar flask allows use of cooling agents such as liquid nitrogen for cooling the detector to achieve the highest efficiency.

In a further aspect of the invention, the serially connected optical fibers are of different cross-sectional areas. The fiber farther from the junction being larger in area so that substantially all of the radiation emitted from the nearer fiber to the junction or thermal bond may be transmitted to the detector. The fibers may be connected with no gap interposed or a gap with suitable coupling material contained therein.

In another aspect of the invention, infrared detectors may be placed on the fibers of a coherent fiber bundle in the same configuration as the semiconductor junctions in the circuit to be measured or thermal bond in the material being bonded. The output signal of these detectors may be representative of the signal of each individual semiconductor junction or thermal flow through each of the bonds, thus allowing automated multiple junction or multiple bond monitoring.

In another aspect of the invention, the infrared detector or infrared detector-optical fiber combination may be calibrated by means of standard radiation sources. The output of the infrared detector will then be representative of the radiative emission from the semiconductor junction or thermal bond and may be compared with the output signal produced by the standards above.

BRIEF DESCRIPTION OF THE DRAWINGS

The foregoing and other objects and advantages of the present invention will be more clearly understood when read in conjunction with the accompanying drawings in which:

FIG. 6 shows another form of the invention in which there are two optical fibers connected serially, the optical fiber which is farther away from the semiconductor junction or thermal bond whose radiation is to be measured and the infrared detector incorporated in a closed system consisting of a bellows and a Dewar flask; and FIG. 7 is an enlarged view of the junction between the two serially connected optical fibers.

DETAILED DESCRIPTION OF THE PREFERRED EMBODIMENTS

Figure 1:
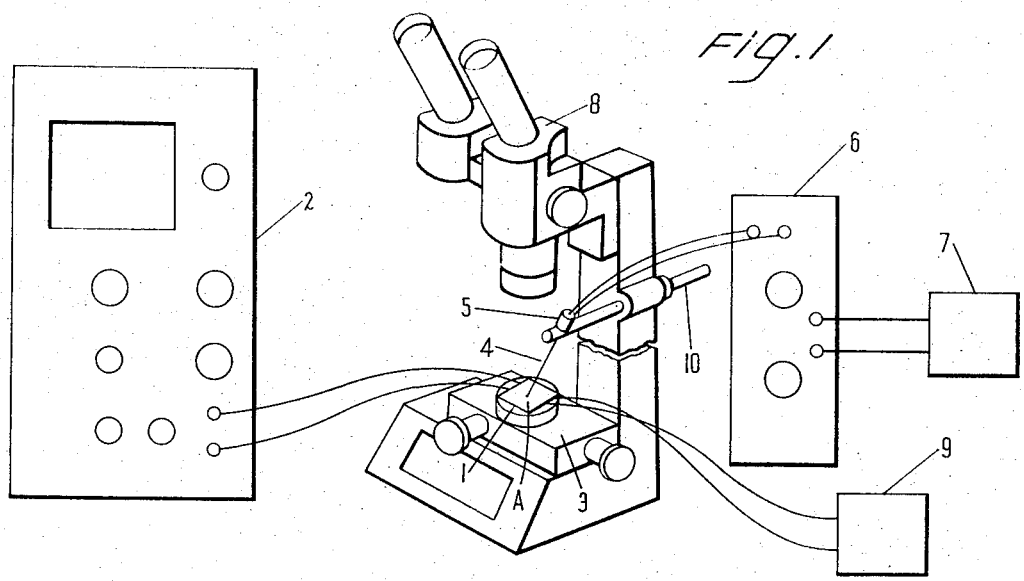
FIG. 1 shows a system for measuring recombination or thermal radiation as embodied in a preferred arrangement specifically designed for measuring such radiation from a semiconductor junction or thermal bond wherein the arrangement includes a single optical fiber, infrared detector and a stereomicroscope for aligning the optical fiber-infrared detector combination with the diode junction or thermal bond.

Corresponding reference symbols will be used throughout the drawing to indicate corresponding elements where applicable.

FIG. 1 illustrates an arrangement for detecting radiation from a semiconductor circuit or materials being bonded 1. This arrangement includes an input source 2 and a bias source 9 to energize the circuit or materials being bonded 1, a pedestal 3 to support the circuit or materials and an infrared detector 5 positioned above the semiconductor circuit or materials being bonded 1 for detecting radiation. This radiation is carried by optical fiber 4 to the infrared detector 5. A stereomicroscope 8 is positioned for use in suitably aligning circuit or materials being bonded 1 with the adjacent end of fiber 4.

The radiation emitted by a semiconductor device, as for example, by diode junction A within the semiconductor circuit or thermal Bond A within material being bonded 1, is picked up by one end of a single optical fiber 4. The other end of the fiber faces an infrared detector 5 whose output variations reflect the variations of the radiation transmitted through the fiber. This output is processed through control electronics 6 and is fed into a display or recording device 7. The output may be fed back to control input source 2 for controlling the input thermal or electrical signal. The feedback network may be illustrated as a line interconnecting control electronics 6 with input source 2 in FIG. 1. Holder 10 integrally combines optical fiber 4 infrared detector 5 and stereomicroscope 8, so that stereomicroscope 8 views the end of optical fiber 4 closest to diode junction or thermal bond A. Alignment of the combination of optical fiber 4 and infrared detector 5 above diode junction A of semiconductor circuit 1 or thermal bond A of materials being bonded 1 is achieved by viewing through stereomicroscope 8 and adjustment of positioning pedestal 3.

Figure 2:
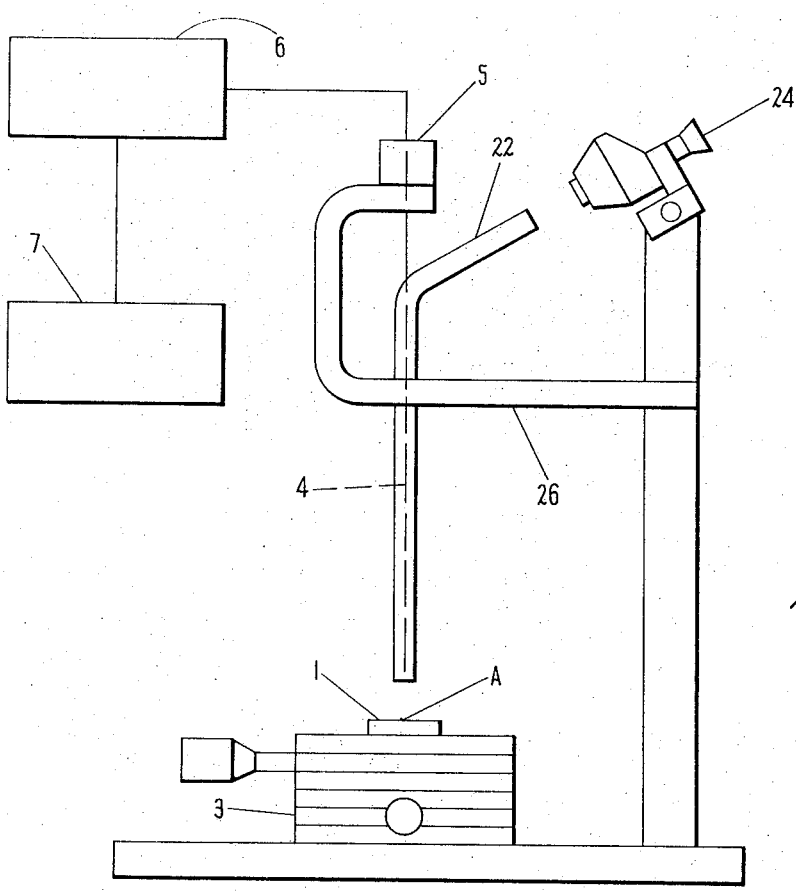
FIG. 2 illustrates a modification of the invention in which a coherent fiber bundle is utilized for viewing and aiming with a conventional microscope, an optical fiber for infrared transmission is attached to the coherent fiber bundle.

FIG. 2 illustrates a modification of the invention in which aiming of the combination of infrared transmitting optical fiber 4 and infrared detector 5 is achieved by means of fiber optic techniques. The coherent optical fiber bundle 22 is attached to infrared transmitting optical fiber 4 in position for viewing by a conventional microscope 24. Infrared detector 5, coherent fiber bundle 22, infrared transmitting optical fiber bundle 22, infrared transmitting optical fiber 4 and conventional microscope 24 are integrally connected by connecting arm 26.

Proper aiming of the infrared transmitting optical fiber 4 and infrared detector 5 combination is achieved by viewing diode junction or thermal bond A through visual microscope 24 and adjusting positioning pedestal 3. The input thermal, bias and output devices may be the same as those described in FIG. 1, wherein the output of the infrared detector 5 is again connected to control electronics 6 and transmitted to recording or display device 7.

Figure 3:
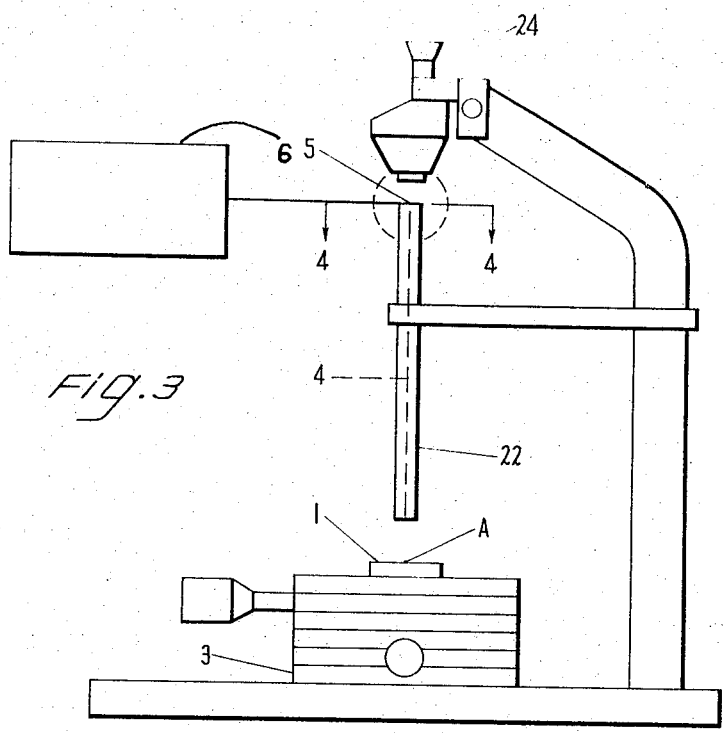
FIG. 3 is a further modification of the invention in which the optical fiber for transmitting the infrared radiation is one of the fibers in the coherent fiber bundle.

FIG. 3 is a further modification of the invention in which the additional optical fiber for infrared transmission is eliminated. Instead, one of the fibers of the coherent fiber bundle 22 is used as the infrared transmitting fiber 4. The infrared detector 5 is placed upon one end of the infrared transmitting fiber 4. The combination of infrared transmitting fiber 4 and infrared detector 5 is aimed by viewing diode junction or thermal bond A by a conventional microscope 24 through coherent fiber bundle 22 and adjusting positioning pedestal 3.

Figure 4:
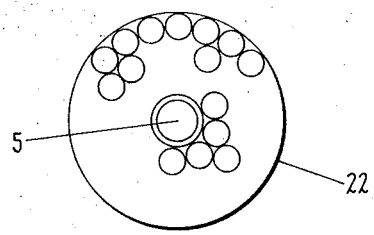
FIG. 4 is a sectional view through section line 4—4 of FIG. 3.

FIG. 4 illustrates the relationship between infrared detector 5, infrared transmitting fiber 4 and coherent fiber bundle 22. This enlarged view better illustrates how aiming is achieved by viewing the assembly through visual microscope 24. In this configuration perfect aiming will take place when the target is covered by the image of the detector.

Figure 5:
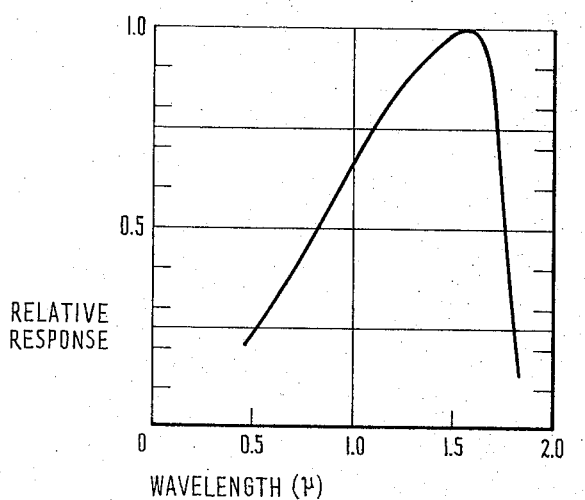
FIG. 5 shows the relative amplitude versus wavelength response of an infrared detector.

FIG. 5 is a curve of the relative amplitude vs. wavelength of an intrinsic germanium detector. The curve is plotted on a single plane using linear orthogonal axes. Relative amplitude response is plotted on the ordinate and wavelength in microns is plotted on the abscissa.

FIG. 6 is a further modification of the invention in which two optical fibers 51 and 52 and infrared detector 5 are incorporated within a closed system comprised of bellows 53, base 59 and Dewar flask 54. The bellows is made adjustable by means of adjusting screws 55 and 55A. This adjustment allows optimum alignment of optical fiber 52 and optical fiber 51. This modification further allows replacement of optical fiber 51 with no disturbance of the closed system.

FIG. 7 better illustrates the arrangement among optical fiber 51, optical fiber 52 and gap 50. Optical fiber 51 is encapsulated within metal sleeve 62 and encircled by spring 61. This interchangeable combination fits within cylindrical system seal 64. Cylindrical system seal 64 coacts with base 59 to radially seal the closed system. Optical fiber 52 is enclosed by sleeve 68 which is also held by system seal 64.

It is believed that the primary radiation detected is infrared radiation caused by recombination of electrons and holes producing photons or thermal emission. For optimum performance an optical fiber which negligibly attenuates wavelengths of interest should be used. Thus, different types of optical fibers may be desired for detecting all wavelengths of radiation from a semiconductor junction. Standard glass optical fibers may be used in the near infrared region (1 micron to 1.5 microns wavelength). In the infrared region itself $As_2 S_3$ optical fibers may be used for wavelengths from 3 to 5 microns. In the far infrared region (5 to 12 microns wavelength) arsenic-selenium-tellurium optical fibers may be used. These types of fibers for the particular range of interest are by no means the only types of fibers that can be used. Other suitable light pipes exist now and more may be found in the future.

Recombination, unlike the inverse process absorption, involves a competition for the minority carrier between all possible recombination routes. Thus the dominant recombination processes are not necessarily those dominating the absorption spectra. The rate of band-to-band recombination depends upon the product of majority and minority carrier concentrations and is much larger for a direct-gap semiconductor. Thus, if competing recombination centers are minimized while the majority carrier density is kept large, radiative band-to-band recombination can be observed in relatively clean indirect-gap semiconductors Si and Ge, as well as in many direct-gap materials such as InSb and GaAs.

Radiative free-to-bound processes or Shockley-Read-Hall capture processes have been studied extensively in Si, Ge and some other compounds. These processes are simultaneous radiative processes in these materials, along with the thermal radiation emitted according to the temperature of the material.

The wavelength of peak recombination radiation emitted by these semiconductors, in general, is a function of the material. (9.94 microns wavelength for GaAs, 1.2 microns for Si and 1.8 microns for Ge.) The exact wavelength of the emission peak in the spectral band depends, to some extent, on the temperature, the impurity level, the mechanical stress, and the lattice deformations of the semiconductor crystal. Whenever the magnitude of these variations is limited, the wavelength of the recombination radiation will not vary greatly from the values listed above.

Thus, detectors which are best suited for measuring the intrinsic recombination radiation are those whose peak sensitivity falls in the near infrared region of the spectrum.

For the particular task of measuring recombination radiation emitted by silicon junctions, an intrinsic germanium detector could be used, since its spectral response (FIG. 5) peaks at approximately 1.5 microns and is sufficiently broad to embrace the wavelength of silicon recombination radiation.

It is believed that radiation is emitted from the base region, as well as the junction regions of transistors. The invention will allow measurement of radiation from the above regions and others not known at this time.

In a specific embodiment of the invention, an integrated circuit containing planar silicon diode junctions was used as a semiconductor circuit. An XYZ micromanipulator type adjustable pedestal capable of being positioned within 0.0001 inches was used. A stereomicroscope of 15× power was used. The control electronics was a preamplifier connected to a noise eliminator whose output was transmitted to an oscilloscope display. A glass optical fiber 2.5 mils in diameter that had been encapsulated into a steel syringe needle for easier handling had been used as the near infrared transmission optical fiber. A Rutherford B7B model type pulse generator had been used to energize the integrated circuit.

In another embodiment of the invention a bundle of coherent optical fibers was attached to the optical transmitting fiber-infrared detector combination. A visual microscope of 15× power was used for aiming. The microscope viewed the diode junction through the coherent optical fiber bundle.

In a further modification of the invention an intrinsic germanium infrared detector may be deposited at one end of an infrared transmitting optical fiber which was part of a coherent bundle of optical fibers.

It is believed that the quality of a thermal bond is dependent on the temperature at which the bonding operation takes place, and on the length of time that temperature is held. During the bonding operation, radiation, as for example infrared radiation, is emitted and may be monitored by radiation measuring equipment. Likewise, the quality of the bond may be determined from a temperature distribution measurement taken after the bonding process.

For example, in the bonding of Kovar flat packs, an integrated circuit is bonded to its substrate by a combination of heat and ultrasonics. A good eutectic alloy form is laid down in the substrate, and another alloy coats the bottom of the integrated circuit chip. With the Kovar at about 375°C to 400°C, the chip is placed on the substrate to heat, then vibrated ultrasonically to make the bond. In the prior art, thermocouples were used to measure the temperature at the bond.

But the thermocouple's relatively large size requires it to be installed, for example on one of the ultrasonic probe tips used to vibrate the chip during bonding, thus the thermocouple usually measures probe temperature rather than the integrated circuit temperature. Also, the time needed to heat or cool the probe tip adds to the thermocouple's response time.

Since the chip is essentially transparent to the infrared radiation produced during the bonding process, the radiation may be monitored, thus guaging the temperature of the bond.

In one method, optical fibers are passed through a vacuum collet which holds the chip in place during bonding, and radiation is measured directly from the integrated circuit's surface. The detected output is displayed on an oscilloscope indicating temperature in a real time fashion.

The means for establishing a thermal flow may be virtually any type. The substrate may be mounted on a hot plate, a flame may be directly applied, an optical source may be used to generate heat, or the substrate may be vibrated manually, ultrasonically or otherwise.

A variety of optical fibers and detectors may be utilized for indicating various temperatures. For example, a quartz fiber may be used to transmit infrared radiation indicative of temperatures as low as 150°C and a glass fiber for temperatures as low as 200°C. Many types of infrared detectors may be used; for example, both Si and intrinsic Ge may be used.

The thermal detecting system may be initially calibrated with a "black body" radiation source having accurate temperature indicating sensors. Once initially calibrated, the system may be calibrated, using an infrared source of particular wavelength, as for example, a GaAs diode infrared source emitting radiation at 0.94 microns. Thus, an output signal level corresponding to temperature may be determined.

Also, the aperture of the optical fiber may be controlled by proper choice of cladding material. The optical indices of the fiber and the cladding material may be chosen so as to enlarge or reduce the effective aperture of the fiber.

An important feature of the invention is the ability to detect, without physical contact, what is believed to be the recombination radiation emitted from selected semiconductor junctions in integrated circuits representative of the signals across the selected junctions. The circuit to be measured may be a single integrated circuit, many integrated circuits or even a single semiconductor junction.

Another important feature of the invention is the ability to detect the radiation emitted along the semiconductor junction itself. The output of the detector reflects the distribution of signal along the semiconductor junction allowing determination of uniformity, current crowding, and the existence of current voids. The measurement of distribution along the semiconductor junction may be point-by-point or by continuous sampling.

In another modification of the invention, a plurality of detectors may be deposited upon optical fibers which are part of a coherent fiber bundle. The deposition of these detectors may take the same configuration as the semiconductor junctions or thermal bonds to be measured (as for example, by using the same mask as is used in the fabrication of the integrated circuit). The output signal from these detectors may be connected to multiple junction or bond monitoring circuitry or individual monitors, thus achieving an automated system for measuring a complete integrated or bonded circuit.

Another feature of the invention is the measurement of thermal emission from semiconductor junctions or any other thermal emitting body. The detector may be calibrated with use of standard temperature sources and thus the output of the detector will reflect the temperature of the emitting body. The invention is particularly useful for measurement of thermal emission of semiconductor junctions, (as for example, a germanium semiconductor emitting radiation in the 5 to 10 micron wavelength range) or of thermal bonds during and after the bonding process.

Another feature of the invention is the spectrophotometric measurement of radiation emitted from very small semiconductor junctions. This accomplished by inserting an optical filter in the gap (as shown in FIGS. 6 and 7) between the two serially connected optical fibers. But the invention works well as a spectrophotometer with the optical filter interposed between the semiconductor junction and one end of the optical fiber or between an end of the optical fiber and the infrared detector.

Another feature of the invention is the extremely small size of the optical fiber which allows the invention to reach an area which would be inaccessible to conventional optical or thermal devices. Moreover, the extremely small size allows the invention to monitor along the length of the thermal bond or semiconductor junction itself.

Another feature of the invention is the immediate response to temperature changes of the target area.

Another feature of the invention is the adaptability of the output signal for use as a feedback signal to control bonding operations so that optimum temperature may be held for an optimum length of time.

Another feature of the invention is the ability to evaluate the quality of thermal bonds while the bonding is in process thereby giving a precise, reliable instantaneous monitoring of the temperature at which the bonding takes place and the length of time during which the temperature is held.

In a further modification of the invention, modulating instrumentation is inserted into the optical path between the object emitting radiation and the infrared detector. The modulating instrumentation may be located in the gap (as is shown in FIGS. 6 and 7) or in any other convenient place in the optical path. Also, the radiation may be modulated by electromagnetically inducing rotation of the polarizing plane in one or more fiber elements. By modulating the infrared frequencies emitted along the optical path, a reference level or base line may be established at the output of the infrared detector. This allows objective comparisons to be made between various output signals from the infrared detector caused by emissions from a variety of semiconductor junctions, or other elements of the target.

In a further modification, there are two serially connected optical fibers for transmission of the radiation from the semiconductor junction. The invention provided for quick disassembly of the optical fiber closest to the radiating material and insertion of a new fiber. This allows for replacement of broken optical fibers without taking apart the complete assembly. This further allows for quick changes in the fiber closest to the radiating material to maintain optimum system sensitivity as the frequency of radiation is varied.

In another modification, the serially connected optical fibers may be connected so that the gap is eliminated. The fiber farther from the emitting source may be larger than the nearer fiber so that the maximum possible energy is coupled to the detector.

In another modification, material is interposed between the serially connected fibers for transmission of energy.

In a further modification of the invention, there are also two serially connected optical fibers, the fiber farther from the radiating material and the infrared detector being enclosed within a closed system. The system may contain a cooling agent such as liquid nitrogen to increase the efficiency of the infrared detector. A bellows is incorporated as part of the system to insure optimum alignment between the serially connected fibers without disturbing the closed system.

In another modification of the invention, a relatively large detector is utilized. A large detector may allow less critical optical fiber-infrared detector alignment.

The invention is illustrated with an infrared detector of the intrinsic germanium type. But since the wavelength of the recombination radiation emitted depends upon the types of semiconductor material used, temperature, impurity level, mechanical stress and lattice deformations of the crystal, a detector whose peak sensitivity falls in the region of the infrared spectrum near the particular wavelength desired to be measured should be used.

Some other devices which also have suitable sensitivities in the wavelength spectrum of interest are intrinsic or extrinsic infrared detectors, frequency converters, photomultipliers and many other suitable sensing devices.

In order to minimize the effect of distance variations between the front end of the optical fiber for infrared transmission and the semiconductor junction whose recombination radiation is to be measured, it is preferred that the optical angle of acceptance be as narrow as possible. This may be achieved, by using for cladding the fiber core, a material whose index of refraction is smaller than, but very close to the index of refraction of the core. In this way, only those rays that enter the front surface of the fiber, in a direction almost parallel to the axis, will propagate by total reflection, while all the rays entering at an angle larger than the critical angle will escape from the fiber core and be absorbed in the outer coating of the cladding.

Also, cladding materials for the infrared transmitting fiber, which caused the wave outside the boundaries of the fiber itself to be evanescent, may be used.

The adjustable positioning pedestal is shown as being operable in a manual manner. But the invention operates equally well with the adjustable positioning pedestal being actuated by mechanical or electrical apparatus, particularly where the volume of semiconductor circuits or semiconductor junctions to be measured is very large. The pedestal may be adjusted by external programmable apparatus to achieve speedy, precise and repeatable measurements especially where high quantity and high density integrated circuit packages are concerned.

The invention is illustrated with an infrared detector which is not biased. The invention operates equally well with a biased detector whose bias may be adjusted so that the detector may operate in the negative resistance portion of its curve, thus triggering emission in an amplification mode. This would be particularly useful where avalanche photodiode detectors are used.

The invention is to be construed as embracing each and every novel feature and novel combination of features present in or possessed by the apparatus and techniques herein disclosed and limited solely by the spirit and scope of the appended claims.

What is claimed is:

1. A non-contact, non-destructive method of monitoring a functioning, operating semi-conductor junction in an electric circuit with known voltage and current values, comprising the steps of capturing the recombination infra-red electromagnetic energy emitted by said junction in an optical fiber means that is of such size that less than 100 percent of the junction being viewed is monitored to enable the detection of radiation emitted at different points along the semiconductor junction and that negligibly attenuates electromagnetic energy at the infra-red wave lengths, conducting said infra-red energy through said optical fiber means to an infra-red transducer, transducing said infra-red energy into an electrical signal, and processing said electrical signal to monitor the operating characteristic of said junction.

2. Apparatus for providing an output signal representative of the quality of a semi-conductor junction having an electrical signal across it comprising, means defining a semi-conductor junction, means for establishing a known electrical junction signal across said junction, infra-red radiation detecting means responsive to infra-red radiation emitted from said semi-conductor junction having an electrical junction signal across it for providing an output signal representative of the quality of said junction, said infra-red detecting means being responsive to an area of the junction which is less than 100 percent of the junction area being viewed to enable the detection of radiation emitted at different points along the semiconductor junction, infra-red radiant energy guiding means for coupling said radiant energy from said semi-conductor junction to said radiation detecting means, said radiant energy guiding means comprising, first optical fiber means, sleeve means for holding said first optical fiber means, second optical fiber means, sleeve means for holding said second optical fiber means, and seal means for holding said sleeve means, said sleeve means for holding said first optical fiber means being unplugable from said seal means, said first and second optical fiber means being serially aligned for conducting infra-red radiation emitted by said semi-conductor junction, and control means responsive to said output electrical signal.

3. Apparatus for providing an output signal representative of the signal across the semi-conductor junction comprising, means defining a semi-conductor junction, means for establishing electrical junction signal across said junction, infra-red radiation detecting means responsive to infra-red radiation from said semi-conductor junction for providing an output electrical signal representative of said junction signal, infra-red radiation guiding means for coupling said infra-red radiant energy from said semi-conductor junction to said infra-red radiation detecting means, support means for carrying said semi-conductor junction, said support means including means for precisely relatively positioning said junction and said infra-red rediation detection means, a microscope means positioned adjacent one end of said radiant energy guiding means for observing when said junction is in alignment with said detecting means, said radiant energy guiding means comprising an optical fiber bundle including a plurality of optical fibers at least one of which is centrally disposed in said bundle for coupling radiant energy from said semi-conductor junction to said infra-red radiation detecting means, the remainder of said fibers in said bundle being positioned for observing the junction with said microscope means.

4. A non-contact, non-destructive method of monitoring a functional, operating device in accordance with claim 1, including the step of establishing a reference level in said electrical signal by modulating the infra-red energy being conducted through the optical fiber means.

5. A non-contact, non-destructive method of monitoring a functional, operating semi-conductor junction in an electric circuit in accordance with claim 1 including the steps of using said optical fiber means to properly position the same to capture the recombination infra-red electromagnetic energy emitted by said junction.

6. Apparatus for non-contact, non-destructive monitoring of a functioning, operating device that during operation emits infra-red radiation from a junction while energized by known voltage and current values, comprising optical fiber means for capturing infra-red radiation from a particular area of said junction which is less than 100 percent of the junction area being viewed to enable the detection of radiation emitted at different points along the semiconductor junction, a transducer responsive to said infra-red radiation emitted from said device for generating an output electrical signal representative of operating characteristics of said operating device, said fiber optic means conducting said captured radiation from said device to said transducer, means to process said output signal, said optical fiber means comprising at least two optical fibers serially connected to each other, the fiber closest to said transducer being larger in diameter than the fiber closest to the functional, operating device, and means serially joining said fibers to each other, said means for serially joining said fibers to each other including means permitting the fiber closest to the functional, operating device to be separated and another fiber positioned in its place.

7. Apparatus in accordance with claim 6 wherein said means to process said electrical signal includes a feedback network to control the functional operation of said device.

* * * * *